Figure 1:
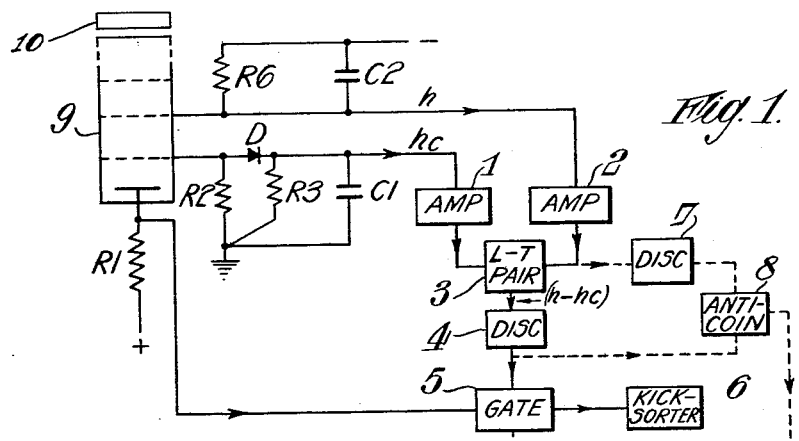

Aug. 1, 1961 F. D. BROOKS 2,994,781
NUCLEAR PARTICLE DISCRIMINATORS
Filed Aug. 27, 1959 3 Sheets-Sheet 1

INVENTOR
FRANCIS DEY BROOKS
BY

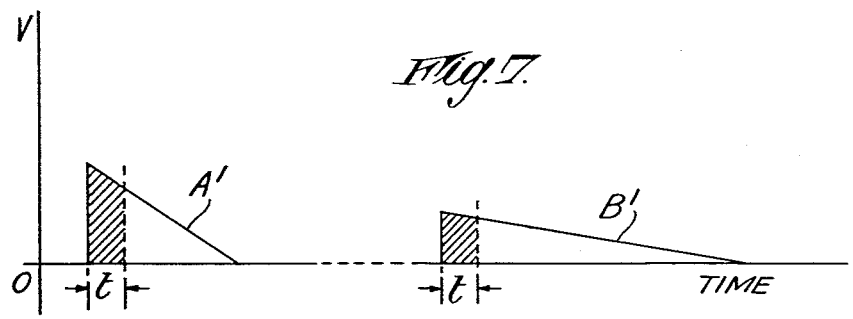
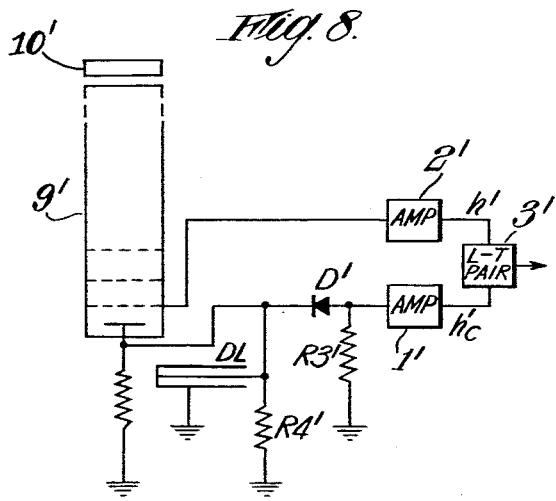
INVENTOR
FRANCIS DEY BROOKS

Aug. 1, 1961 F. D. BROOKS 2,994,781
NUCLEAR PARTICLE DISCRIMINATORS
Filed Aug. 27, 1959 3 Sheets-Sheet 3

INVENTOR
FRANCIS DEY BROOKS
BY

United States Patent Office 2,994,781
Patented Aug. 1, 1961

2,994,781
NUCLEAR PARTICLE DISCRIMINATORS
Francis Dey Brooks, Buckland, near Faringdon, England, assignor to United Kingdom Atomic Energy Authority, London, England
Filed Aug. 27, 1959, Ser. No. 836,389
5 Claims. (Cl. 250—207)

This invention relates to nuclear particle discriminators and relates particularly to means for discriminating between types of particles detected by scintillation counters. The present application is a continuation-in-part of our copending application Serial No. 681,974 filed September 4, 1957, and now abandoned.

It is known that, with many organic phosphors, the decay times of scintillations produced by alpha particles, protons and similar heavily ionising particles are longer than the decay times of electron-excited scintillations. For example it has been shown (Wright, Proc. Phys. Soc. B vol. 69, pt. 3, No. 435B, p. 358, March 1, 1956) that for anthracene the decay times (the time taken for the pulse to fall to $1/e$ of its initial level) are 31 m$\mu$ sec. for electron excitation and 53 m$\mu$ sec. for alpha particle excitation. Similar differences have been found in other organic phosphors such as stilbene, quaterphenyl and various liquid and plastic scintillators, and also when fast neutrons (i.e. recoil protons) are substituted for alpha particles.

The present invention makes use of this phenomenon to provide means for discriminating between different types of particles producing scintillations, e.g. for counting fast neutrons in a background of gamma rays.

According to the present invention a particle discriminator for use with a scintillation counter including a photomultiplier tube having electrodes comprises connections for obtaining two similar pulses from two electrodes of the photomultiplier tube for each scintillation, means for deriving from one of said similar pulses a first pulse of amplitude substantially dependent only on the amplitude of said one similar pulse, means for deriving from the other of said similar pulses a second pulse of amplitude dependent on both the amplitude and duration of said other similar pulse, means for deriving a difference pulse proportional to the difference in amplitude of said first and second pulses, and amplitude discriminating means for selecting said difference pulses, whereby pulses may be selected which correspond to scintillation pulses produced by a given type of particle.

In one embodiment of the invention said first-mentioned means comprises a unidirectional conducting device connected in series with a capacitor to form a pulse-stretching circuit, said second-mentioned means comprising an integrating circuit.

In another embodiment of the invention said first-mentioned means comprises a shorted delay-line for clipping said one similar pulse at a fixed time after the commencement thereof, said second-mentioned means comprising an integrating circuit.

In yet another embodiment of the invention said two electrodes are the anode and a dynode and said deriving means are such that said first and second pulses are of opposite polarities, a connection including a resistor being made between each said deriving means and a common output resistor across which the said difference pulses are developed. The means for deriving said first and second pulses preferably comprise first and second integrating circuits respectively, said integrating circuits each including a resistor connected between a said electrode and a fixed potential whereby said resistors are effectively in parallel with at least the stray capacities of said electrodes, said first integrating circuit having a time-constant small compared with said second integrating circuit, and first and second pulse-stretching circuits connected to said first and second integrating circuits respectively, said pulse-stretching circuits each including a diode connected in series with a resistor and a capacitor connected in parallel.

Figure 2:
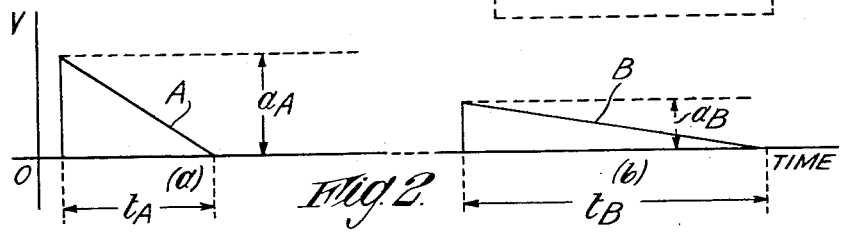
Figure 9:
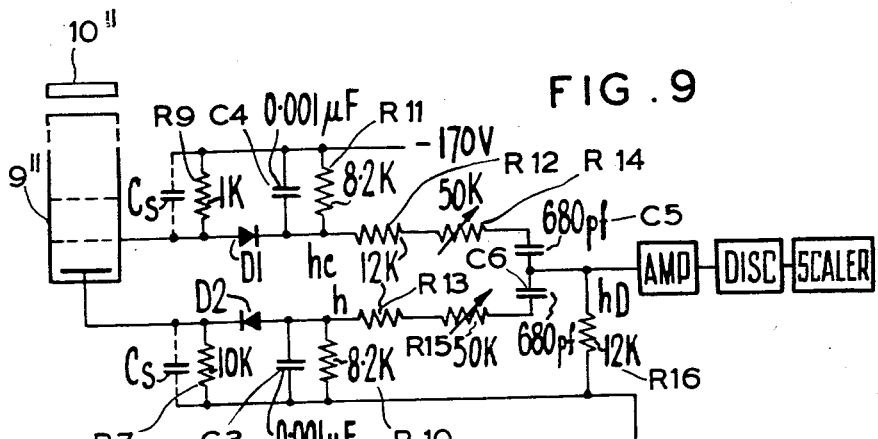
Figure 10:
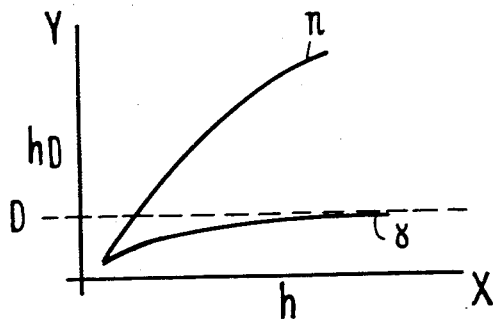
Figure 11:
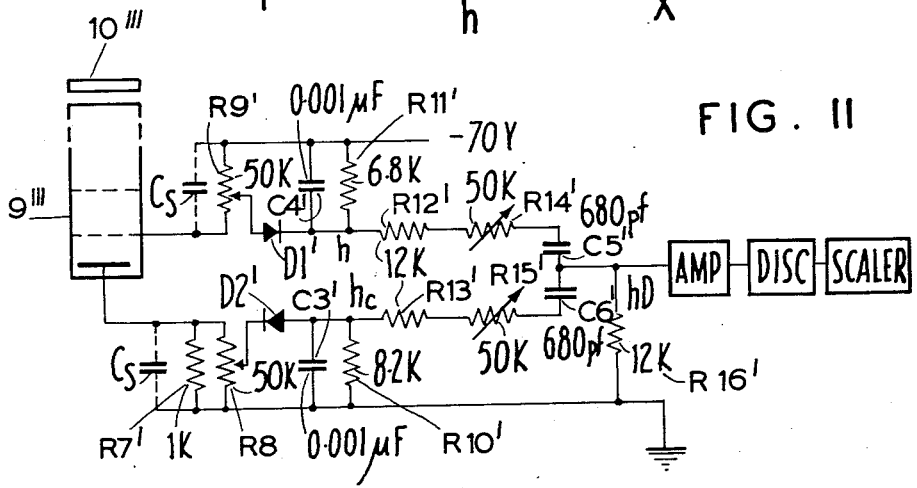

To enable the nature of the invention to be more readily understood, attention is directed by way of example to the accompanying drawings wherein:

FIG. 1 is a semi-schematic circuit diagram of one embodiment of the invention.
FIG. 2 shows two idealised pulses to illustrate the principle of operation of the embodiment of FIG. 1.
FIGS. 3–6 represent cathode-ray tube displays obtainable with the embodiment of FIG. 1.
FIG. 7 shows two idealised pulses to illustrate the principle of operation of another embodiment of the invention.
FIG. 8 is a partial circuit diagram of another embodiment of the invention.
FIG. 9 is a circuit diagram of yet another embodiment of the present invention including component values.
FIG. 10 represents a cathode-ray tube display obtainable with the embodiment of FIG. 9.
FIG. 11 is a circuit diagram of a preferred embodiment of the invention including component values.

Referring firstly to FIG. 1, a photomultiplier tube 9 associated with a scintillator 10 is shown having its anode connected to a positive potential through a resistor R1. The last dynode is connected to earth through a resistor R2 and through a diode D to one side of a condenser C1, the other side of which is earthed. A resistor R3 is connected between the junction of D and C1 and earth.

The second last dynode is connected to a negative potential through a resistor R6 and to one end of a condenser C2 the other side of which is also connected to the negative potential. The other dynodes are connected in the conventional manner.

The pulses appearing across condensers C1 and C2 are fed through amplifiers 1 and 2 respectively to a long-tailed pair circuit 3, the output of which is proportional to the difference in their amplitudes and is fed to a variable-bias discriminator circuit 4. The output pulse from this discriminator operates a gate 5 through which pulses developed across R1 can be fed to a kicksorter (pulse-amplitude analyser) 6.

The operation of the circuit will now be explained with reference to FIGS. 2, 3 and 4. In FIG. 2(a) an idealised triangular dynode output pulse A is shown of amplitude $a_A$ and duration $t_A$. FIG. 2(b) shows another dynode pulse B whose area is the same as that of pulse A but whose amplitude $a_B$ is half, and duration $t_B$ twice that of pulse A. These two pulses are produced by scintillations producing the same total light output, but pulse A is produced by a particle giving a relatively short and pulse B by a particle giving a relatively long decay time with the phosphor in use.

The circuit associated with the second-last dynode acts as an integrator and produces across C2 a pulse whose amplitude $h$ is proportional to the integrated area of the pulse which appeared at the dynode. Thus in the case of the two pulses A and B the output pulses across C2 have the same amplitude. The circuit associated with the last dynode, however, is believed at the high frequencies involved to act in a known way as a pulse-stretching circuit so that the amplitude $h_c$ of the pulse appearing across C1 is proportional to the amplitude of the pulse which appeared at the dynode. Hence pulse A produces across C1 an output pulse of amplitude twice that of pulse B.

If these $h$ and $h_c$ pulses are applied after suitable amplification to the X and Y plates of a cathode-ray tube, and the trace is brightened only when the applied pulses are at their peak values, then each scintillation is registered as a point whose co-ordinates are ($h$, $h_c$) on the CRT screen. The points resulting from a series of scintillations of different light outputs but similar decay times (e.g. a Compton distribution) thus form a locus on the screen. The curves A and B in FIG. 3 represent the loci of pulses having decay times corresponding to those of pulses A and B respectively. For example, using a polonium-beryllium source (gamma plus neutron) and a stilbene crystal, curve A represents scintillations produced by the gamma rays (relatively short decay time) and curve B scintillations produced by the fast neutrons, i.e. recoil protons, (relatively long decay time).

Figure 3:
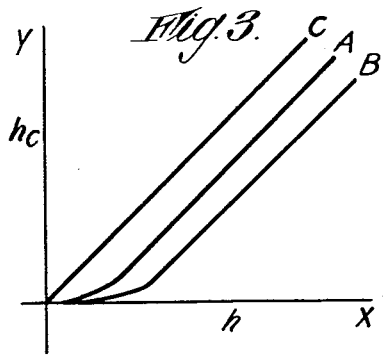
Figure 4:
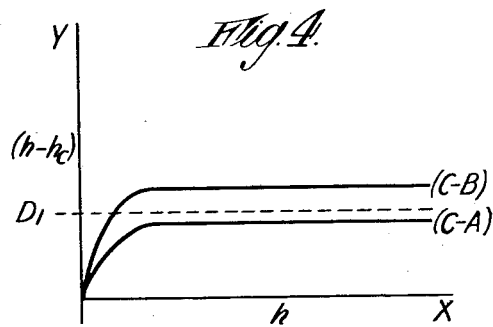
Figure 5:
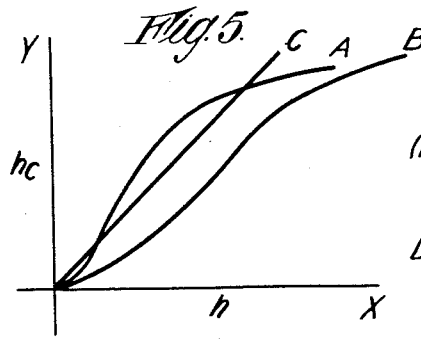
Figure 6:
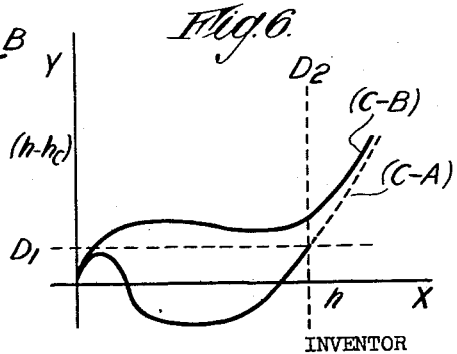

The curve C in FIG. 3 is produced by applying the $h$ pulses to both X and Y plates. By suitable adjustment of amplifier gains the curves A, B and C can often be made to run substantially parallel to one another over a large portion of their lengths, (i.e. over a large range of particle energies). If now the curves A and B are each subtracted from curve C and the differences ($h-h_c$) applied to the Y plates of a CRT again having the $h$ pulses applied to its X plates, the difference pulses have loci of the form shown in FIG. 4. In the circuit of FIG. 1 this subtraction is effected by the long-tailed pair 3. By setting the bias of the discriminator circuit 4 at the level represented by the dotted line D1 in FIG. 4, it can be arranged that only the (C—B) pulses trigger the discriminator and operate the subsequent gate 5 to admit the B pulse to the kicksorter 6. The CRT is not a necessary part of the apparatus and has only been included in the description to assist the explanation.

Where the A, B and C curves do not run substantially parallel, but are of the form shown in FIG. 5, the difference curve is of the form shown in FIG. 6. If the discriminator is set as shown by the line D1, not only B pulses but also those A pulses shown dotted will be counted. To prevent this a second discriminator (7 in FIG. 1) can be inserted in the $h$ channel in addition to that in the ($h-h_c$) channel.

This second discriminator is only triggered by $h$ pulses having an amplitude greater than that indicated by the line D2. The output of the two discriminators are fed to an anticoincidence circuit (8 in FIG. 1) which is only triggered in the absence of a pulse from the $h$ discriminator and the gate is operated by the output from the anti-coincidence circuit.

Using stilbene as the phosphor, this embodiment has been used to detect fast neutrons, and, using a boron-loaded liquid, to detect slow neutrons, in both cases discriminating against a gamma background.

Where it is not required to analyse (e.g. to kicksort) the wanted pulses but simply to count them, the gate can be omitted and the output taken directly from the discriminator or anti-coincidence circuit to a scaler or ratemeter. It will also be appreciated that where both the A and B pulses are to be recorded, the discriminator 4 can be replaced by a two-channel kicksorter, the outputs of which may further be used to control a pair of gates.

Component values used in this embodiment are:

| | | |
|---|---|---|
| R1 | $k\Omega$ | 10 |
| R2, R6 | $k\Omega$ | 1 |
| R3 | $k\Omega$ | 4.7 |
| C1, C2 | $\mu f$ | 0.001 |
| D | CV | 253 |

An alternative method of deriving the $h_c$ pulse is illustrated in FIGS. 7 and 8. Referring firstly to FIG. 7, A' and B' again represent idealised equal-area pulses delivered from the photo-multiplier tube. It will be seen that, if the pulses are clipped a relatively short time $t$ after the commencement of the pulse, the area of the clipped pulse (shown shaded) is substantially independent of the duration of the pulse and depends mainly on the amplitude.

In FIG. 8 an $h_c'$ output is obtained from the anode and an $h'$ output from the last dynode. The anode is connected to a shorted delay line DL terminated by a resistor R4' whose value is made equal to the characteristic impedance of the line DL. The crystal diode D' is connected between the anode and the resistor R3' as shown. The action of the delay line DL, resistors R4' and R3', and diode D' is to clip the output pulse from the anode after a fixed time depending on the electrical length of the delay line.

To preserve the shape of the clipped pulse, the input time-constant of amplifier 1' has to be comparable with the duration of the pulse. In this case, therefore, the integrating time-constant of the amplifier itself is made large compared with the duration of the pulse, so that the amplifier output pulse (the $h_c'$ pulse) is proportional to the area of the clipped pulse. Similarly the $h'$ pulse is shown as produced by the integrating time-constant of the amplifier 2', although this pulse could be formed as in the preferred embodiment by an integrating circuit connected directly to the last dynode.

This embodiment has been used to distinguish 4 mev. alpha particles from approximately 1 mev. gamma rays using stilbene as the phosphor. Approximately 99% of the gamma rays were eliminated while 80–90% of the alpha particles were counted. It has also been used to distinguish fast neutrons from gamma rays.

In the embodiments shown in FIGS. 9 and 11, advantage is taken of the fact that the photomultiplier anode pulse is a negative pulse and the dynode pulse a positive pulse to simplify the derivation of the difference pulse.

Referring to FIG. 9, the photomultiplier tube 9'' is shown having its anode connected to earth through a resistor R7 and its last dynode connected to —170 v. through a resistor R9. Across both of these resistors there is an effective stray capacity $C_s$ which is approximately the same for both electrodes. With the component values shown, the time-constant of the anode circuit is thus ten times that of the dynode circuit and the anode pulse is therefore integrated to a much greater extent than the dynode pulse. The integrated anode and dynode pulses are fed through diodes D2 and D1 respectively to long time-constant circuits comprising resistors R10 and R11 and capacitors C3 and C4. The amplitude of the stretched pulse appearing at the anode of D2 therefore depends not only on the amplitude but also on the area of the anode pulse, whereas the amplitude of the stretched pulse appearing at the cathode of D1 depends mainly on the amplitude of the dynode pulse. The pulse at the anode of D2 therefore corresponds to the aforementioned $h$ pulse and the pulse at the cathode of D1 to the $h_c$ pulse.

The $h$ and $h_c$ pulses are fed separately through two attenuators comprising fixed resistors R13 and R12, variable resistors R15 and R14 and capacitors C6 and C5 respectively to a common output resistor R16 across which the difference pulse $h_D$ is developed. The difference pulse is fed through an amplifier AMP to a discriminator DISC whose threshold voltage is set to accept only difference pulses corresponding to the type of radiation it is required to measure, e. g. neutrons in the presence of gamma rays, and thence to a SCALER. Capacitor C5 is a blocking capacitor against the —170 v. on the last dynode and C6 is included to maintain symmetry.

The variable resistors R15 and R14 are provided for setting up the circuit, which is done with the aid of an oscilloscope. The $h_D$ pulse is applied to the Y-plates and an $h$ pulse taken directly from the anode of D2 is applied to the X-plates. The type of trace obtained is shown in FIG. 10 where the curve marked $n$ is the locus of difference pulses corresponding to neutron scintillations, and that marked $\gamma$ the locus of difference pulses corresponding to gamma scintillations. The values of the resistors R15 and R14 are adjusted to obtain the maximum separation between the loci and to bring the $\gamma$-locus as close as possible to the X-axis. The discriminator bias is adjusted to the level D shown in FIG. 10 at which the $\gamma$-locus no longer appears on the tube.

Referring now to FIG. 11 the photomultiplier tube 9'''

(Type EMI 6097) is shown having its anode connected to earth through a resistor R7′ in parallel with a potentiometer R8, and its last dynode connected to −70 v. through a resistor R9′. As the stray capacitors $C_s$ of both electrodes are again approximately equal, with the values shown the time-constant of the dynode circuit, $C_sR9'$, is about fifty times that of the anode circuit, $C_sR7'$. Hence the dynode pulse is integrated to a much greater extent than the anode pulse. The integrated anode and dynode pulses are fed from tappings on the potentiometers R8 and R9′ through diodes D2′ and D1′ (Type CV 425) respectively to the two long time-constant circuits comprising capacitor C3′ and resistor R10′, and capacitor C4′ and resistor R11′. The amplitude of the stretched pulse developed across R11′ therefore depends on the total area of the dynode pulse, whereas the amplitude of the stretched pulse developed across R10′ depends mainly on the amplitude of the anode pulse, i.e. in the present embodiment the pulse developed across R11′ corresponds to the $h$ pulse and the pulse developed across R10′ to the $h_c$ pulse in the aforementioned specification.

As in the embodiment described with reference to FIG. 9, the $h$ and $h_c$ pulses are fed separately through two attenuators comprising fixed resistors R12′ and R13′, variable resistors R14′ and R15′ and capacitors C5′ and C6′ respectively to a common output resistor R16′ across which the difference pulse $h_D$ is developed.

The potentiometers R8, R9′ and the variable resistors R14′, R15′ are provided for setting up the circuit, which is again done with the aid of an oscilloscope. The diodes D1′ and D2′ are selected for similar resistance-voltage characteristics and the potentiometers R8, R9′ are first adjusted so that the amplitudes of the pulses applied to the two diodes are approximately the same; non-linearities introduced by D1′ and D2′ are therefore similar for the two pulses. Thereafter the $h_D$ pulse is applied to the Y-plates and a highly-integrated pulse, preferably derived from the penultimate dynode, is applied to the X-plates. The values of the attenuator resistors R14′ and R15′ are then adjusted as before to obtain the maximum separation between the loci.

It will be seen that, with the component values shown, the time-constant C4′, R11′ is rather less than the time-constant C3′, R10′. Hence the tail of the $h$ pulse falls more rapidly than the tail of the $h_c$ pulse. The effect is to ensure that when the pulses are due to a γ-ray, no part of the difference pulse $h_D$ can be positive. The same result would be achieved if the two time-constants were exactly equal, but as the latter cannot readily be ensured it is preferred to make C4′, R11′ smaller than C3′, R10′.

I claim:

1. A particle discriminator for use with a scintillation counter including a photomultiplier tube having electrodes, comprising connections for obtaining two similar pulses from two electrodes of the photomultiplier tube for each scintillation, means for deriving from one of said similar pulses a first pulse of amplitude substantially dependent only on the amplitude of said one similar pulse, means for deriving from the other of said similar pulses a second pulse of amplitude dependent on both the amplitude and duration of said other similar pulse, means for deriving a difference pulse proportional to the difference in amplitude of said first and second pulses, and amplitude discriminating means for selecting said difference pulses, whereby pulses may be selected which correspond to scintillation pulses produced by a given type of particle.

2. A particle discriminator as claimed in claim 1 wherein said first-mentioned means comprises a unidirectional conducting device connected in series with a capacitor to form a pulse-stretching circuit, and said second-mentioned means comprises an integrating circuit.

3. A particle discriminator as claimed in claim 1 wherein said first-mentioned means comprises a shorted delay-line for clipping said one similar pulse at a fixed time after the commencement thereof, and said second-mentioned means comprises an integrating circuit.

4. A particle discriminator as claimed in claim 1, wherein said two electrodes are the anode and a dynode and said deriving means are such that said first and second pulses are of opposite polarities, and comprising a connection including a resistor between each said deriving means and a common output resistor across which the said difference pulses are developed.

5. A particle discriminator as claimed in claim 4 wherein the means for deriving said first and second pulses comprise first and second integrating circuits respectively, said integrating circuits each including a resistor connected between a said electrode and a fixed potential whereby said resistors are effectively in parallel with at least the stray capacities of said electrodes, said first integrating circuit having a time-constant small compared with said second integrating circuit, and first and second pulse-stretching circuits connected to said first and second integrating circuits respectively, said pulse-stretching circuits each including a diode connected in series with a resistor and a capacitor connected in parallel.

References Cited in the file of this patent

UNITED STATES PATENTS

| | | |
|---|---|---|
| 2,742,576 | Dandl | Apr. 17, 1956 |
| 2,750,513 | Robinson et al. | June 12, 1956 |